(12) United States Patent
Serdarevic et al.

(10) Patent No.: US 7,896,048 B2
(45) Date of Patent: Mar. 1, 2011

(54) CHUCKS AND USE IN PROCESSING TOROIDAL STRUCTURES

(75) Inventors: Amir Serdarevic, Des Moines, IA (US); John J. Kaiser, Urbandale, IA (US); William Lutes, Urbandale, IA (US)

(73) Assignee: Bridgestone Americas Tire Operations, LLC

( * ) Notice: Subject to any disclaimer, the term of this patent is extended or adjusted under 35 U.S.C. 154(b) by 1115 days.

(21) Appl. No.: 11/594,619

(22) Filed: Nov. 8, 2006

(65) Prior Publication Data

US 2008/0105358 A1    May 8, 2008

(51) Int. Cl.
    *B29D 30/24*    (2006.01)
(52) U.S. Cl. .................................. 156/398; 156/415
(58) Field of Classification Search ......... 156/414–417, 156/406.2, 421.8; 193/37; 226/190, 196.1; 242/615.2, 615.21
    See application file for complete search history.

(56) References Cited

U.S. PATENT DOCUMENTS

| | | | |
|---|---|---|---|
| 1,273,926 A * | 7/1918 | Roesen .................. 226/196.1 |
| 2,208,767 A * | 7/1940 | Macdonald et al. ......... 156/132 |
| 2,490,445 A | 12/1949 | Kuffler |
| 2,600,291 A | 6/1952 | Engler |
| 2,878,857 A * | 3/1959 | Smith et al. .............. 156/406.2 |
| 3,111,445 A | 11/1963 | Pouilloux et al. |
| 3,380,872 A | 4/1968 | Pouilloux |
| 4,685,992 A | 8/1987 | Irie |
| 4,693,431 A | 9/1987 | Kataoka |
| 4,737,222 A | 4/1988 | Cardenas .................... 156/415 |
| 4,771,963 A | 9/1988 | Gattrugeri |
| 4,906,321 A | 3/1990 | Mateer et al. |
| 5,035,567 A | 7/1991 | Davis |
| 5,127,979 A | 7/1992 | Mateer et al. |
| 5,635,016 A | 6/1997 | Byerley |
| 5,709,768 A | 1/1998 | Byerley |
| 6,004,250 A | 12/1999 | Byerley |
| 6,058,999 A | 5/2000 | Roberts et al. |
| 6,202,955 B1 | 3/2001 | Self |
| 6,235,135 B1 | 5/2001 | Sergel et al. |
| 6,267,318 B1 | 7/2001 | Gensheimer |
| 6,408,919 B2 | 6/2002 | Cordaillat et al. |
| 6,539,998 B2 | 4/2003 | Sergel et al. |
| 6,571,682 B2 | 6/2003 | Roberts et al. |
| 6,673,183 B2 | 1/2004 | Byerley |
| 6,712,308 B1 | 3/2004 | Fordham |
| 2003/0024383 A1 | 2/2003 | Roberts et al. |
| 2003/0024626 A1 | 2/2003 | Byerley |

OTHER PUBLICATIONS

GB 922,463, Dunlop Rubber Co., Apr. 3, 1963.
EP0410310 (Continental AG), Jan. 30, 1991.

* cited by examiner

*Primary Examiner*—Geoffrey L Knable
(74) *Attorney, Agent, or Firm*—Thomas R. Kingsbury; Wayne Beavers

(57) ABSTRACT

A chuck and a chuck system, and a method for processing a toroidal structure such as a tire carcass. The carcass includes an internal circumference and tapered ends. The chuck system comprises a plurality of chucks wherein each chuck includes a circumferential or substantially circumferential external surface and a plurality of friction reducing members positioned on the external surface. The friction reducing members are positioned to engage the internal circumference of the toroidal structure such as a tire. The method of processing a tire carcass includes positioning the tire carcass on fixed diameter chucks having friction reducing members on the external surface.

7 Claims, 5 Drawing Sheets

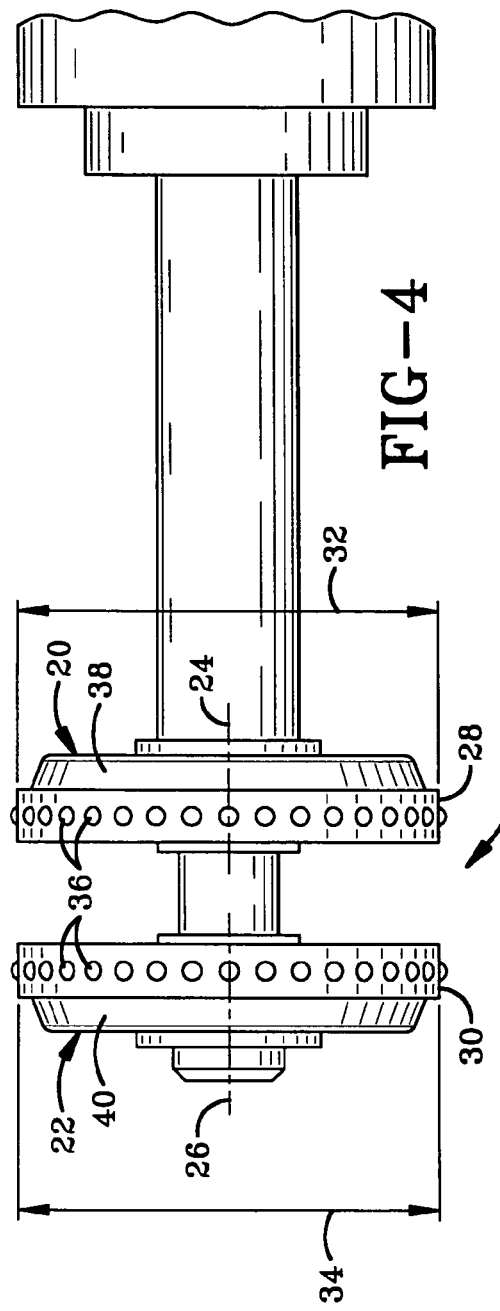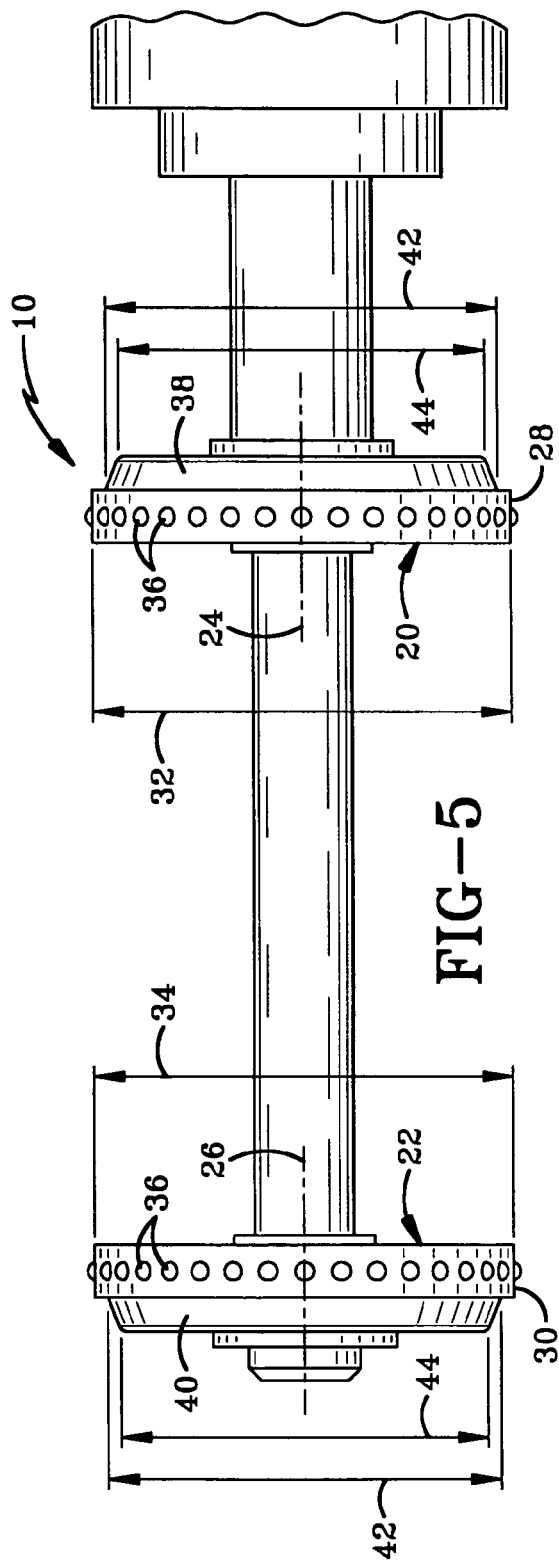

CHUCKS AND USE IN PROCESSING TOROIDAL STRUCTURES

FIELD OF THE DISCLOSURE

The present disclosure relates to chucks that may be used in the processing of toroidal structures. In another embodiment, the present disclosure relates to improved chucks, that may be used in the formation of a green tire wherein the chucks facilitate the placement of a tire carcass on the chucks and the removal of the resultant green tire from the chucks.

BACKGROUND

The tire industry is one of the leading industries in the world. As such, it stands to reason that the tire making process can be a highly sophisticated process in which much of the assembly process is automated. Several prior art attempts have been made to improve the production of tires and improve the individual steps and processes involved therein.

Generally, the tire making process involves the formation of a carcass, which can also be referred to as a casing, which is the foundation for the tread, belts, bead, and sidewalls of the finished tire. The carcass is processed and these other items are added until the formation of a green tire is complete. The green tire is then vulcanized, or cured, to solidify and bond the various components of the tire resulting in a finished tire product.

The step that is of interest in the current disclosure is the transformation from the carcass stage to the green tire stage. This may involve rotating the carcass on chucks and applying various materials, such as the tread, to the carcass. During this process, normally the internal portion of the carcass is pressurized to maintain the generally cylindrical shape of the carcass during the application of the tread, bead, belt and other features to the carcass. Additionally, the carcass may have a snug fit around the chucks. As such, the use of prior art chucks may result in some degree of difficulty in placing the carcass on the chucks and removing the carcass from the chucks.

Prior attempts to alleviate these difficulties include the development of chucks that have expandable and retractable diameters. These chucks include an overall diameter that can collapse inside the internal circumference of the carcass during placement and removal of the carcass and expand out to engage the internal diameter of the carcass during the manufacturing process.

Other attempts to address these difficulties have included the use of lubrication around the surfaces of the chucks. The lubrication is typically applied in a liberal manner to ease the positioning and removal of the carcass on the chucks. This use of lubrication may result in an untidy work area and potentially undue wear and tear on the processing equipment and work stations around the processing equipment.

Other prior art attempts to address these difficulties have included chuck systems having an internal bladder positioned on the processing machine to expand and engage the carcass once the carcass is positioned on the processing machine. This normally requires complicated machinery and failures may be experienced due to the additional elements in the processing machine and the potential failure of the bladders themselves in their expansion and retraction process.

What is needed then is a single chuck, or a chuck system having two or more chucks, that may be used in the processing of toroidal structures such as tire that facilitates the placement of the toroidal structure on the chuck and the removal of the toroidal structure from the chuck(s). Typically, this system requires minimal to no lubrication.

BRIEF SUMMARY OF THE DISCLOSURE

Disclosed is a chuck that is useful for many purposes, such as for the processing of a toroidal structure that has an internal circumference. The chuck comprises a circumferential or substantially circumferential external surface, and a plurality of friction reducing members spaced around the external surface that engages the internal circumference of the toroidal structure, such as a tire carcass.

Also disclosed herein is a chuck system that comprises a plurality of chucks wherein each chuck includes a circumferential or substantially circumferential external surface having a plurality of friction reducing members positioned on the external surface.

In the instance where the toroidal structure that may be processed on the chuck or chuck system is a tire carcass, the chuck or chucks may have a fixed diameter and a tapered section positioned adjacent to the external surface. This is a result of the tire carcass having an internal circumference and tapered ends.

A circumferentially tapered section can extend from the external surface such that the sloped surface of the tapered section is positioned in a direction substantially skew to the axis. A shoulder can be positioned between the external surface and a tapered section such that the tapered section decreases in diameter as the tapered section extends from the external surface. The tapered section can be shaped to engage the tapered ends of the toroidal structure to form a gaseous seal within the toroidal structure.

Also disclosed is a chuck system for the processing of a tire carcass. The chuck system comprises at least two, or more chucks, wherein each chuck can include a circumferential or substantially circumferential external surface having a fixed diameter and a plurality of friction reducing members positioned on the external surface that engage the internal circumference of the tire carcass. The axes of the chucks can be substantially aligned. A tapered section can be positioned adjacent to the external surface of each chuck. The tapered sections can be pointed in opposing directions and shaped to engage the tapered ends of the tire carcass and form a gaseous seal.

Also disclosed is a method of processing a tire carcass wherein the method includes positioning the tire carcass on fixed diameter chucks having a plurality of friction reducing members on the external surface, extending the chucks axially within the tire carcass, forming a gaseous seal between the chucks and a tire carcass, retracting the chucks axially within the tire carcass, and removing the tire carcass from the chucks.

Other and further objects, features and advantages of the present invention will be readily apparent to those skilled in the art upon reading the following disclosure when taken in conjunction with the accompanying drawings

BRIEF DESCRIPTION OF THE SEVERAL VIEWS OF THE DRAWINGS

FIG. 4 is a side view of a chucks system made in accordance with the current disclosure.

FIG. 5 is a side view similar to FIG. 4. FIG. 5 shows separation of chucks with respect to one another.

FIG. 7 shows an example of the chucks separated and engaging the carcass to form a gaseous seal therebetween.

DETAILED DESCRIPTION OF THE INVENTION

Figure 1:
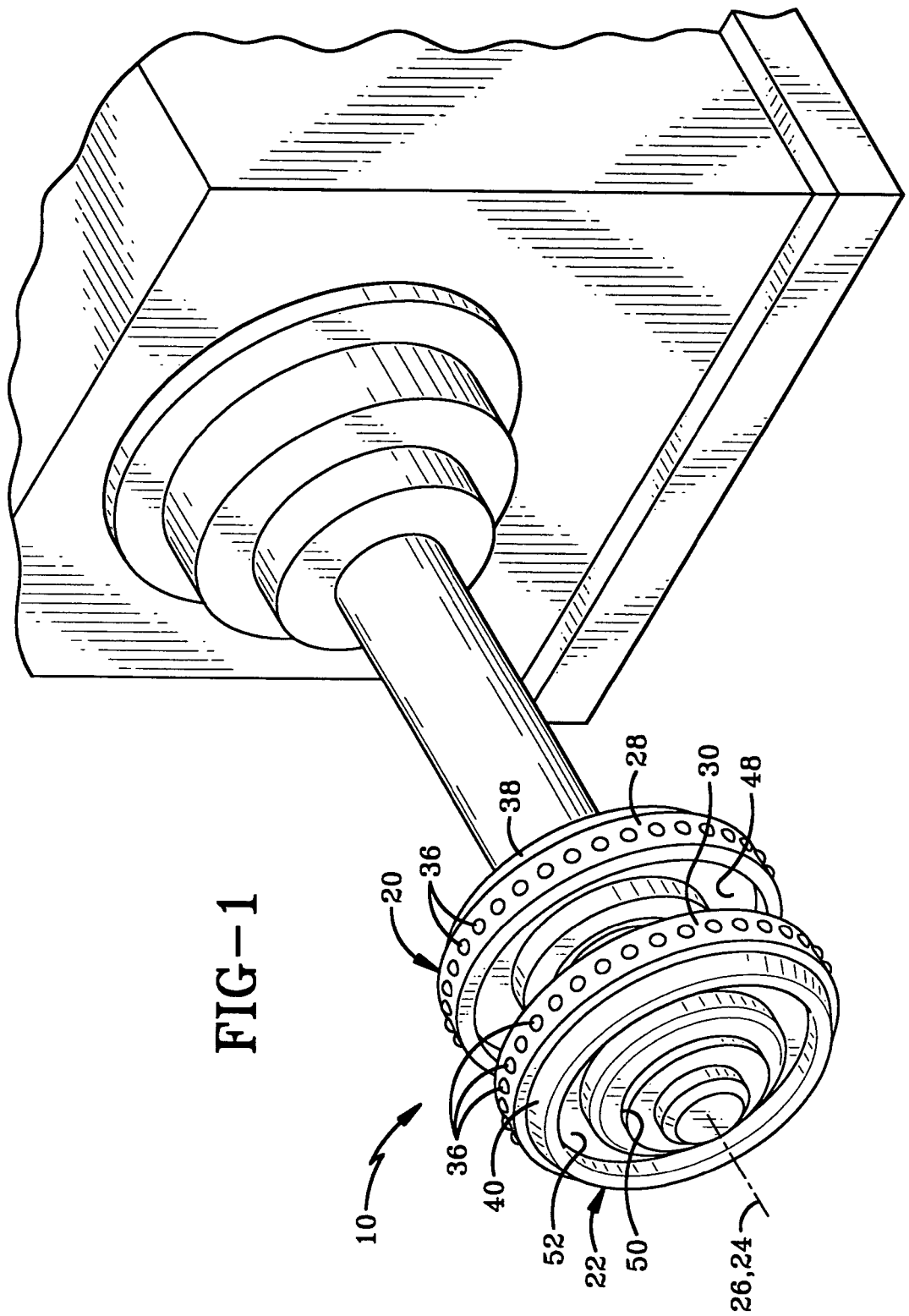
FIG. 1 is a perspective view of a chucks system including chucks made in accordance with the current disclosure.
Figure 3:
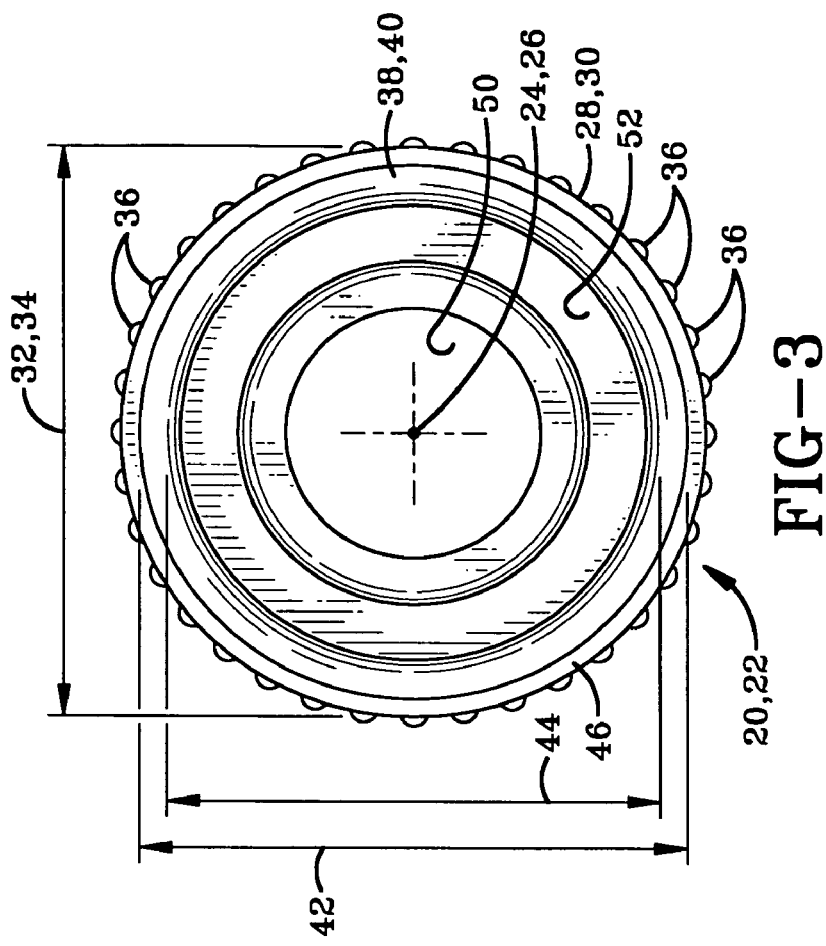
FIG. 3 is a front view of a chuck made in accordance with the current disclosure.
Figure 2:
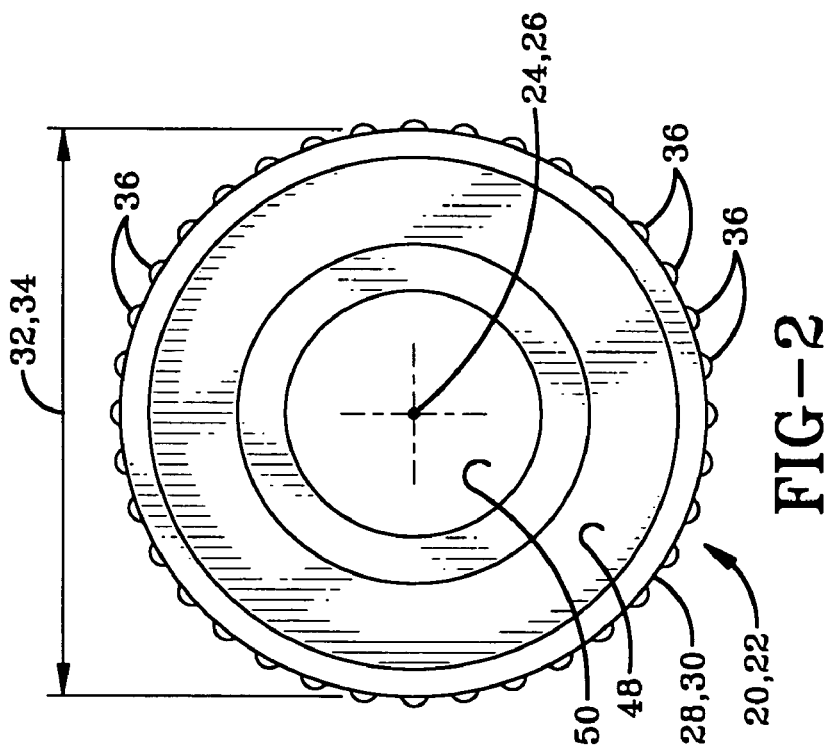
FIG. 2 is a back view of a chuck made in accordance with the current disclosure.
Figure 6:
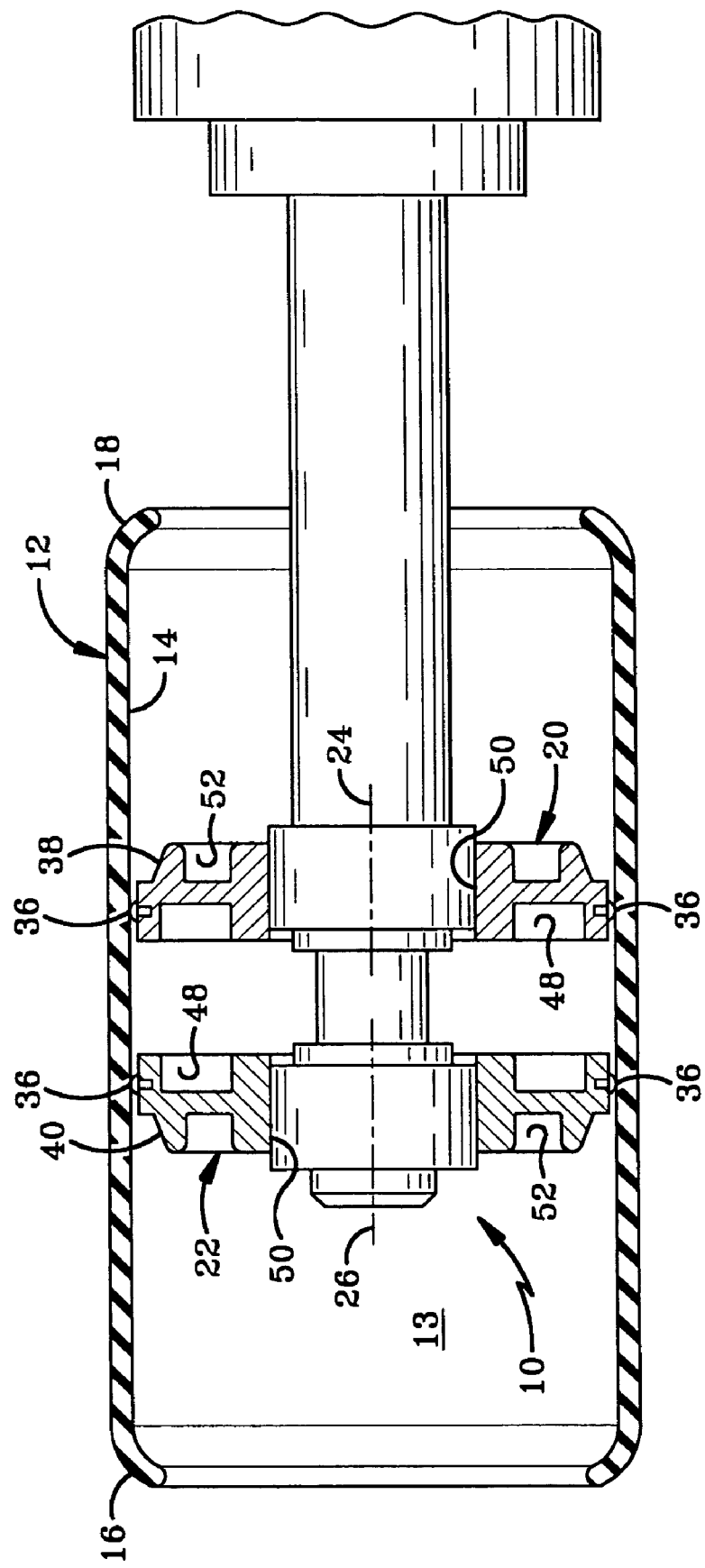
FIG. 6 is a cross sectional view of a carcass positioned on chucks made in accordance with the current disclosure before the chucks are separated within the carcass.
Figure 7:
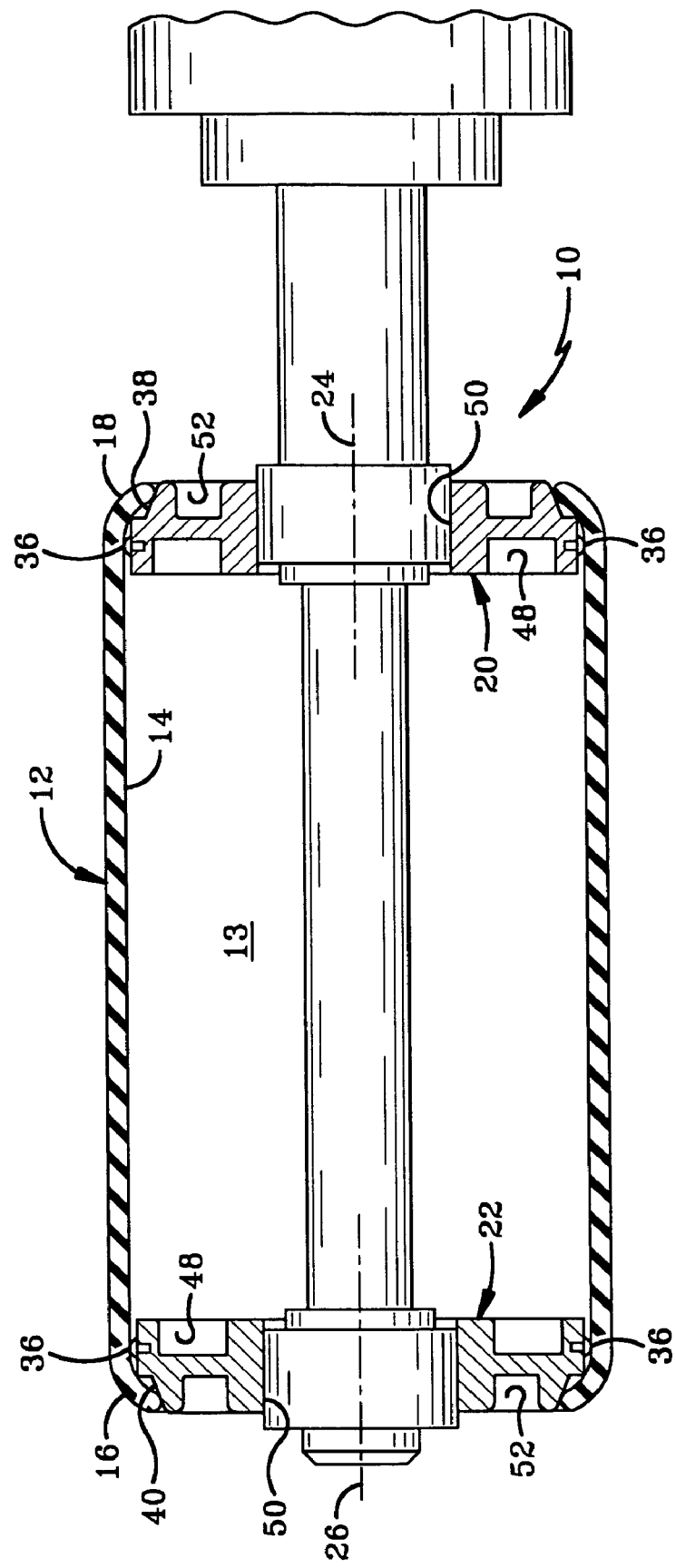
FIG. 7 is a cross sectional view similar to FIG. 5.

Referring generally now to FIGS. 1-7, a chucks system is shown and generally designated by the number 10. The chucks system 10 can be utilized in normal ambient conditions found in most tire manufacturing facilities and is used in the processing of a tire carcass 12 wherein the tire carcass 12 includes an internal circumference 14 and tapered ends 16 and 18.

The chucks system 10 includes first and second chucks 20 and 22. Each chuck 20 and 22 includes an axis 24 and 26, and comprises a substantially circumferential surface 28 and 30 wherein each circumferential surface 28 and 30 has a non-expandable fixed diameter 32 and 34, respectively.

The chucks 20 and 22 can be made of a suitable material such as steel, aluminum, plastic, nylon, and other similar materials known in the art. The chucks 20 and 22 can be machined to accept the friction reducing members 36, which can be generally referred to as rolling devices 36, wherein these devices 36 are positioned along the external surfaces 28 and 30 on the outer diameters 32 and 34. The positioning of the devices 36 facilitate engagement of the devices 36 to the internal circumference 14, or internal surface 14, of the tire carcass 12.

A plurality of friction reducing members 36 can be positioned on the external surfaces 28 and 30 to engage the internal circumference 14 of the tire carcass 12. Each chuck 20 and 22 can further include a tapered section 38 and 40, respectively, where each tapered section 38 and 40 can be positioned adjacent to the external surface 28 or 30, respectively. The axes 24 and 26 are preferably aligned while the tapered sections 38 and 40 are preferably pointed in opposing directions and are shaped to engage the tapered ends 16 and 18 of the tire carcass 12. The tapered section 38 and 40 are preferably pointed in opposing directions and are shaped to engage the tapered ends 16 and 18 of the tire carcass 12. The tapered sections 38 and 40 can be described as extending from the external surfaces 28 or 30 such that the sloped surface of the tapered sections 38 and 40 are positioned in a direction substantially askew to the axis 24 or 26.

The engagement between the tapered sections 38 and 40 and the tapered ends 16 and 18 forms a gaseous seal such that a volume of gas can be supplied internally to the tire carcass 12. The gaseous seal can also be described as a fluid seal wherein the seal is substantial enough to allow the introduction of gases within the internal body 13 of the tire carcass 12, which facilitates the circumferential shape of the tire carcass 12 during the processing of the tire carcass 12, as is known in the art.

The friction reducing members 26, which can be barrel shaped rollers, transfer balls, omni style rollers, ball bearings, spring loaded balls, and other friction reducing members known in the art, are positioned to allow the tire carcass 12 to traverse the external surfaces 28 and 30 in a direction substantially parallel to the axes 24 and 26. These friction reducing members 36 facilitate the movement, such as sliding, of the tire carcass 12 over the chucks 20 or 22. The use of the friction reducing members 36 also facilitates a reduction in the amount of lubrication that may be used in the chucks system 10.

For example, in a first embodiment, the first and second chucks 20 and 22 include reduced lubrication. In a second embodiment, the first and second chucks 20 and 22 include lubrication on or in the friction reducing members 36. In a third embodiment, the first and second chucks 20 and 22 do not include lubrication, and are regarded as non-lubricated. It will be apparent to one skilled in the art that this non-lubrication does not necessarily exclude lubrication between the chucks and axes or supports upon which the chucks 20 and 22 sit and/or are rotated, as is conventionally used and known in the art. The contemplated reduction in lubrication can be from the reduction in lubrication that is conventionally applied to the chucks for friction reduction between the inner surface of the tire carcass and the chuck used for positioning of the tire carcass in relation to prior art chucks.

In one embodiment, the external surfaces 28 and 30 are a fixed distance from the axis 24 and 26. The external surfaces 28 and 30 can also be shaped to coincide with the shape of the internal circumference 14 of the tire carcass 12.

Each tapered section 38 and 40 can further include a second diameter 42 and a third diameter 44. The second diameters 42 can be positioned adjacent to the external surfaces 28 and 30 while the third diameter 44 can be distal from the external surfaces 28 and 30. In these embodiments the second diameter 42 is larger than the third diameter 44 to facilitate the overall tapered shape of the tapered sections 38 and 40. Additionally, the external surface diameters 32 and 34 can be larger than the second diameter 42. This facilitates the presence of a shoulder 46 between the external surfaces 28 and 30 and the tapered sections 38 and 40 respectively.

Each chuck 20 and 22 can further include a first annular aperture 48 positioned opposite the tapered sections 38 or 40 and a second annular aperture 50 positioned between the axis 24 or 26 and the first annular aperture 48. A third annular aperture 52 can also be positioned between the tapered section 38 or 40 and the axis 24 or 26. These annular apertures assist the operation of the chuck system by facilitating a closer proximity between the chucks when the chuck system is in a collapsed position. This close proximity assists in the placement and removal of the carcass on the chucks. Additionally, the annular apertures reduce the amount of material used in the formation of the chucks, thereby reducing the production cost of the chuck system.

The friction reducing members 36, in one embodiment, extend from the external surfaces 28 or 30 in a direction that is substantially perpendicular to the axis 24 or 26. Each of the friction reducing members 36 can be spaced on the external surface 28 or 30 in a position such that the friction reducing members 36 are substantially equidistant from other friction reducing members 36.

The current chuck system 10 and the chucks 20 and 22, that have the friction reducing members 36, achieve several benefits. For example, there is a reduction in the cost of material, the use of lubricant reduced or eliminated, and the reduction or elimination of several traditional steps in the tire manufacturing process improves productivity.

A method of processing a tire carcass is also taught. The method includes positioning a tire carcass on fixed diameter chucks having a plurality of friction reducing members on the surface thereof, separating the chucks axially within the tire carcass, forming a gaseous seal between the chucks and tire carcass, retracting the chucks axially within the tire carcass, and removing the tire carcass from the chucks. This method eliminates or reduces several traditional steps in the tire manufacturing process, improves productivity, and thus reduces manufacture time and cost in the tire manufacturing process.

The invention has been described with reference to various specific and illustrative embodiments and techniques. However, one skilled in the art will recognize that many variations and modifications may be made while remaining within the spirit and scope of the invention.

What is claimed is:

1. A chuck system for engaging a tire carcass, the tire carcass having an internal circumference and tapered internal ends, the chuck system comprising:
    first and second chucks, each chuck having a non-expandable fixed diameter circumferential external surface defined about a central rotational axis of the chuck system, the chucks and the tire carcass being rotatable about the central rotational axis;
    the chucks being co-axially mounted relative to each other and the central rotational axis and being movable axially relative to each other between a retracted position and a separated position; and
    each chuck including a plurality of friction reducing members extending radially outward from its non-expandable fixed diameter circumferential external surface for engaging the internal circumference of the tire carcass, the friction reducing members being radially non-expandable relative to the central rotational axis, the friction reducing members being rotatable relative to the external surface of their respective chucks so that friction between the chucks and the tire carcass is reduced during relative axial movement of one or both of the chucks relative to the tire carcass.

2. The chuck system of claim 1, wherein:
    the first and second chucks include first and second tapered sections, respectively, the first and second tapered sections tapering away from each other in axially opposite directions for engaging the tapered internal ends of the tire carcass when the chucks are in their separated position.

3. The chuck system of claim 2, wherein:
    each tapered section has a maximum diameter less than the fixed diameter of the circumferential external surface of its respective chuck, so that a radially extending shoulder is defined on each chuck between its circumferential external surface and its tapered section.

4. The chuck system of claim 1, wherein:
    the plurality of friction reducing members of each chuck are circumferentially equidistantly spaced from each other.

5. The chuck system of claim 1, wherein:
    the friction reducing members extend from the external surfaces of their respective chucks substantially perpendicularly to the axis.

6. The chuck system of claim 1, wherein:
    the friction reducing members are selected from the group consisting of barrel shaped rollers, transfer balls, omni style rollers, ball bearings, spring loaded balls, and combinations thereof.

7. The chuck system of claim 1, wherein:
    the fixed diameter circumferential external surface of each chuck is a cylindrical surface.

* * * * *